US010311347B2

(12) United States Patent
Ramadan et al.

(10) Patent No.: US 10,311,347 B2
(45) Date of Patent: Jun. 4, 2019

(54) SYSTEM FOR SECURE DATA VALIDATION

(71) Applicant: Hospitality Marketing Concepts, LLC, Newport Beach, CA (US)

(72) Inventors: Mokhtar Ramadan, Newport Beach, CA (US); Peter T. Gorla, Newport Beach, CA (US); Khaled Aboudan, Newport Beach, CA (US); Abed Chawa, Newport Beach, CA (US)

(73) Assignee: HOSPITALITY MARKETING CONCEPTS, LLC, Newport Beach, CA (US)

( * ) Notice: Subject to any disclaimer, the term of this patent is extended or adjusted under 35 U.S.C. 154(b) by 97 days.

(21) Appl. No.: 15/150,071

(22) Filed: May 9, 2016

(65) Prior Publication Data
US 2016/0330212 A1 Nov. 10, 2016

Related U.S. Application Data

(60) Provisional application No. 62/159,089, filed on May 8, 2015.

(51) Int. Cl.
*G06F 7/04* (2006.01)
*G06F 15/16* (2006.01)
(Continued)

(52) U.S. Cl.
CPC ... *G06K 19/06028* (2013.01); *G06F 3/04842* (2013.01); *G06F 21/34* (2013.01);
(Continued)

(58) Field of Classification Search
USPC .......................................................... 726/3
See application file for complete search history.

(56) References Cited

U.S. PATENT DOCUMENTS

| 2008/0126145 | A1* | 5/2008 | Rackley, III | ......... G06Q 20/102 455/406 |
| 2010/0057573 | A1* | 3/2010 | Singhal | .................. G06Q 30/02 705/14.64 |
| 2011/0302017 | A1 | 12/2011 | Marti et al. | |
| 2012/0323664 | A1 | 12/2012 | Klems | |

(Continued)

FOREIGN PATENT DOCUMENTS

WO    WO-2014/044751    3/2014

OTHER PUBLICATIONS

WO, PCT/US2016/031507 ISR and Written Opinion, dated Sep. 1, 2016.

(Continued)

*Primary Examiner* — Brandon S Hoffman
*Assistant Examiner* — Samuel Ambaye
(74) *Attorney, Agent, or Firm* — Morrison & Foerster LLP

(57) ABSTRACT

A network connected secure system for validating electronic certificate codes. The network connected secure computing system is coupled to a network for access by a plurality of users at a plurality of user devices. The system includes a database to store information including at least user accounts, electronic certificates associated with the user accounts, and electronic certificate codes associated with the electronic certificates. The system also includes a downloadable mobile software application. The system is configured to validate the downloaded mobile software application, provide one or more electronic certificates and one or more electronic certificate codes for display at the user devices.

15 Claims, 8 Drawing Sheets

(51) Int. Cl.
| | |
|---|---|
| *G06F 17/30* | (2006.01) |
| *H04L 29/06* | (2006.01) |
| *G06K 19/06* | (2006.01) |
| *G06F 3/0484* | (2013.01) |
| *H04W 12/04* | (2009.01) |
| *H04W 4/50* | (2018.01) |
| *G06F 21/34* | (2013.01) |
| *G06Q 99/00* | (2006.01) |
| *G06Q 10/10* | (2012.01) |
| *G06Q 30/00* | (2012.01) |
| *H04W 12/06* | (2009.01) |

(52) U.S. Cl.
CPC ........... *G06Q 10/10* (2013.01); *G06Q 30/018* (2013.01); *G06Q 99/00* (2013.01); *H04L 63/068* (2013.01); *H04W 4/50* (2018.02); *H04W 12/04* (2013.01); *G06F 2221/2137* (2013.01); *H04W 12/06* (2013.01)

(56) References Cited

U.S. PATENT DOCUMENTS

| | | | |
|---|---|---|---|
| 2013/0024267 | A1 | 1/2013 | Libenson et al. |
| 2013/0144700 | A1 | 6/2013 | Vandeburg et al. |
| 2013/0166607 | A1 | 6/2013 | Turk et al. |
| 2014/0149197 | A1* | 5/2014 | James ................ G06Q 30/0225 705/14.26 |
| 2014/0257963 | A1 | 9/2014 | Landis |
| 2014/0297431 | A1* | 10/2014 | Catania .............. G06Q 30/0277 705/14.73 |
| 2015/0235198 | A1* | 8/2015 | Liezenberg .......... G06Q 20/322 705/44 |

OTHER PUBLICATIONS

Invitation to Respond to Written Opinion dated Jun. 19, 2018, directed to Singapore Application No. 11201709146R; 7 pages.
Extended Search Report dated Dec. 13, 2018, directed to EP Application No. 16793333.2; 7 pages.

\* cited by examiner

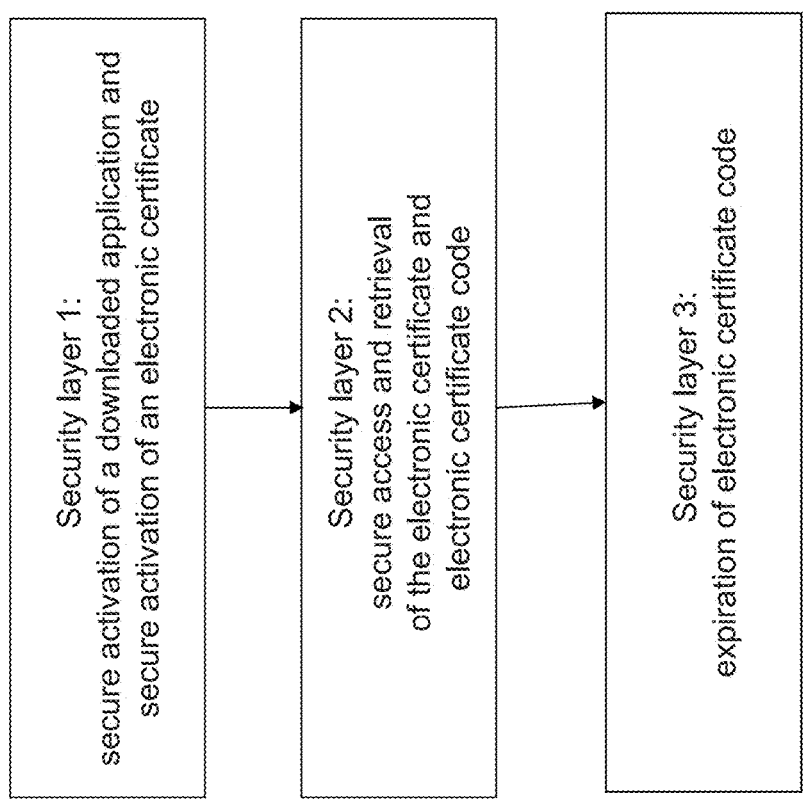

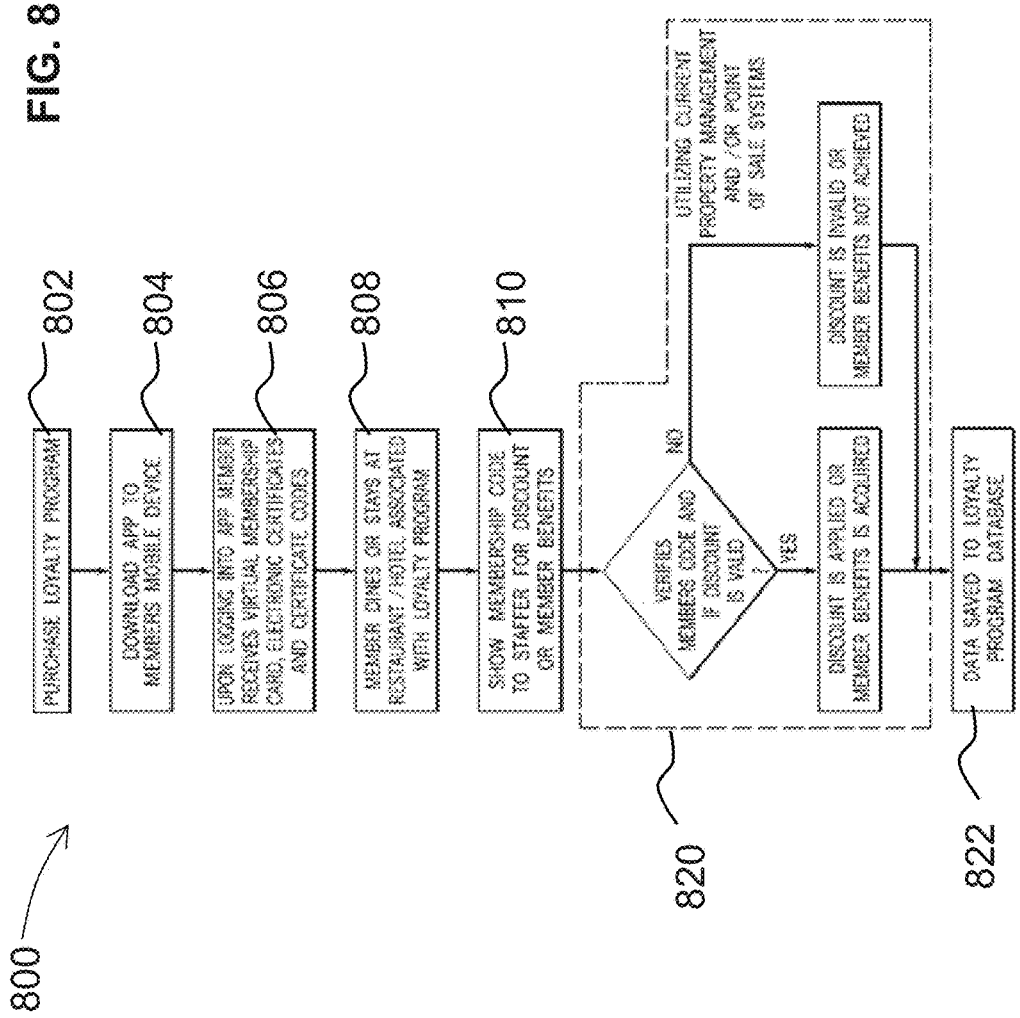

SYSTEM FOR SECURE DATA VALIDATION

CROSS-REFERENCE TO RELATED APPLICATIONS

The present application claims benefit of priority with U.S. Provisional Application No. 62/159,089, filed May 8, 2015, which is hereby incorporated by reference.

TECHNICAL FIELD

The invention generally relates to system and method for secure data validation, and more particularly, to a network connected system for validating data using multiple security layers.

BACKGROUND

Data validation based on physical documents, for example, data on plastic cards or papers, are historically and easily subject to fraud and forgery, and specifically to unauthorized reproduction and use. Systems that use and rely on physical documents are increasingly vulnerable to security concerns. Documents can now be stored as electronic data in databases. These data still need to be validated to avoid fraudulent use.

It is therefore desirable to provide system and method for implementing computer-based and network-based system for securely validating electronic data using multiple security layers, and that provides advantages heretofore unknown in the art.

SUMMARY OF THE INVENTION

Provided herein are embodiments of system and method for validating electronic certificate codes. In some embodiments, a network connected secure system for validating electronic certificate codes is provided. The network connected secure computing system is coupled to a network for access by a plurality of users at a plurality of user devices. The network connected secure computing system includes a database to store information including at least user accounts, electronic certificates associated with the user accounts, and electronic certificate codes associated with the electronic certificates. The network connected secure computing system also includes a downloadable mobile software application. The network connected secure computing system is configured to validate the downloaded mobile software application, provide one or more electronic certificates and one or more electronic certificate codes for display at the user devices.

In some embodiments, a computer-readable non-transitory storage medium configured with data and with instructions that when executed by at least one processor causes the at least one processor to perform a process for validating electronic certificate codes is provided. The process includes creating one or more user accounts associated with one or more users at one or more user devices, generating one or more electronic certificates associated with the one or more user accounts, generating one or more electronic certificate codes associated with the one or more electronic certificates, storing the one or more user accounts, the one or more electronic certificates, and the one or more electronic certificate codes in one or more databases, downloading a mobile software application to the one or more user devices, providing one or more activation codes to the one or more users, and validating the mobile software application.

BRIEF DESCRIPTION OF THE SEVERAL VIEWS OF THE DRAWINGS

Illustrated in the accompanying drawing(s) is at least one of the best mode embodiments of the present invention. In such drawing(s):

FIG. 3 illustrates a multi-layer security process for validating electronic certificate codes according to an embodiment of the present invention;

FIG. 8 illustrates a process of a hotel loyalty program system according to an embodiment of the present invention.

DETAILED DESCRIPTION OF THE PREFERRED EMBODIMENTS

Figure 1:
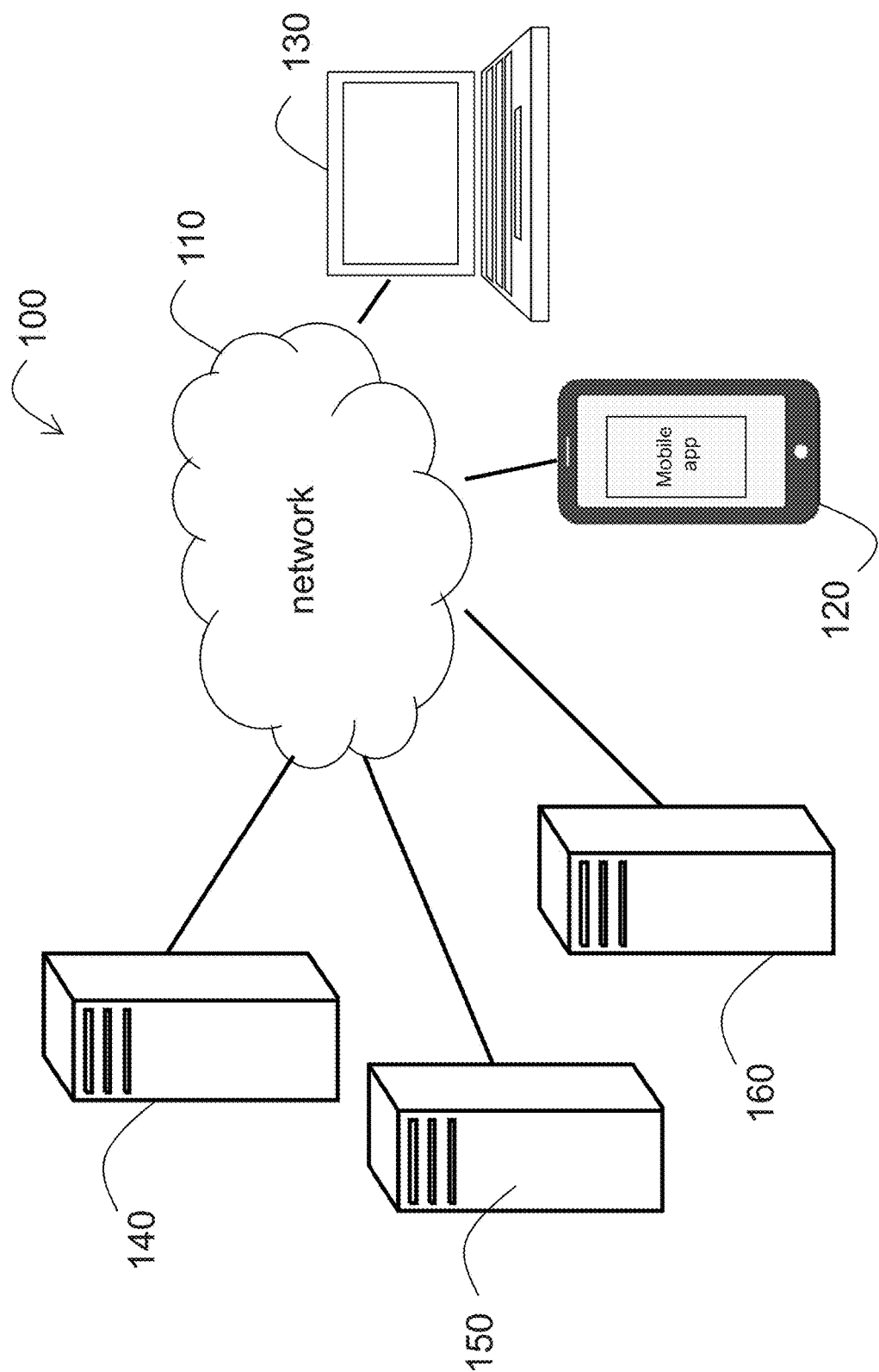
FIG. 1 illustrates a system for validating electronic certificate codes according to an embodiment of the present invention.

The below described drawing figures illustrate the described apparatus and its method of use in at least one of its preferred, best mode embodiment, which is further defined in detail in the following description. While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the broad aspect of the invention to the embodiment illustrated. All features, elements, components, functions, and steps described with respect to any embodiment provided herein are intended to be freely combinable and substitutable with those from any other embodiment unless otherwise stated. Those having ordinary skill in the art may be able to make alterations and modifications to what is described herein without departing from its spirit and scope. Therefore, it should be understood that what is illustrated is set forth only for the purposes of example and should not be taken as a limitation on the scope of the present invention and its method of use.

In the following description and in the figures, like elements are identified with like reference numerals. The use of "e.g.," "etc," and "or" indicates non-exclusive alternatives without limitation, unless otherwise noted. The use of "including" or "includes" means "including, but not limited to," or "includes, but not limited to," unless otherwise noted.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B", when used in conjunction with open-ended language such as "comprising" can refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

Figure 2:
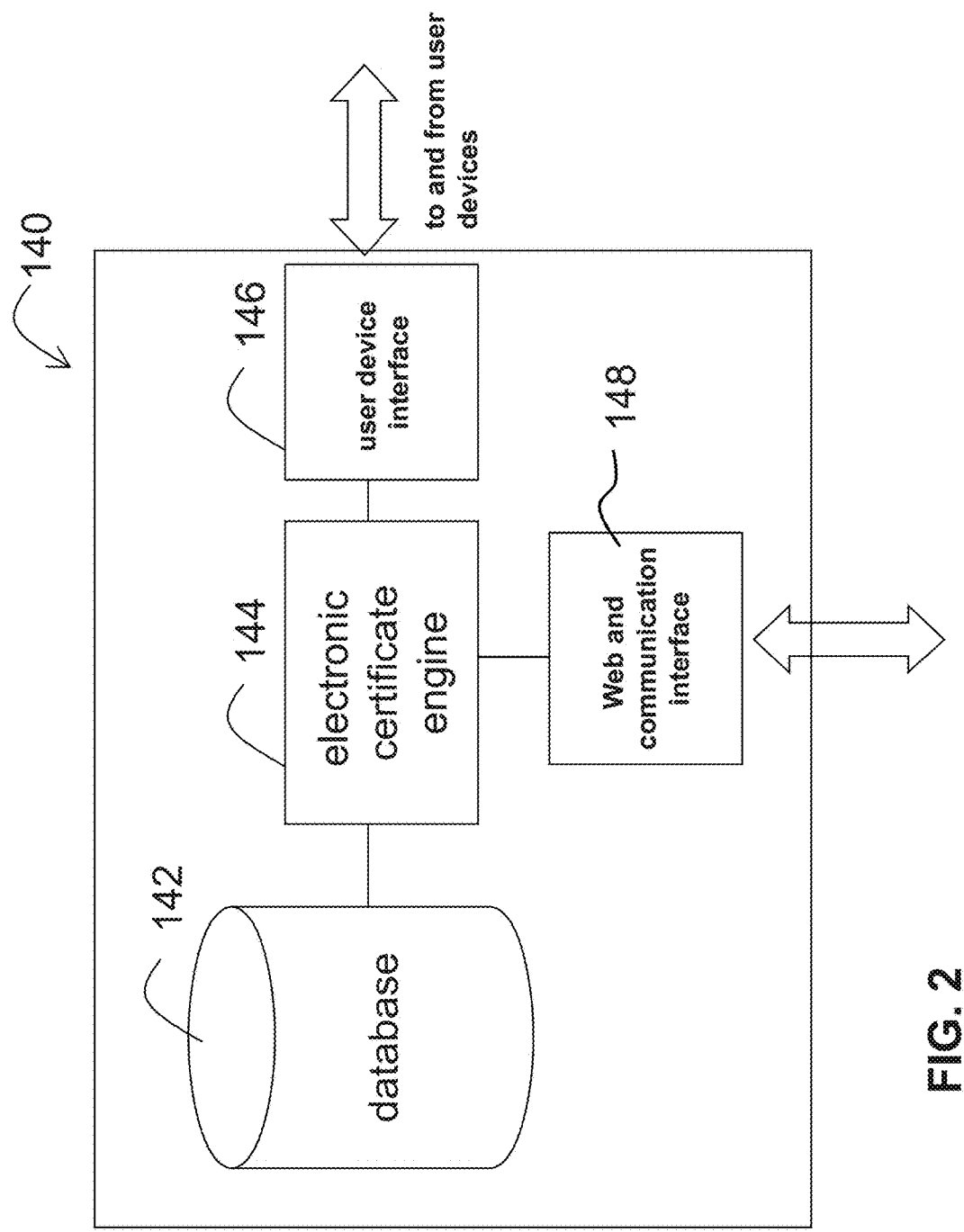
FIG. 2 illustrates a computing system for validating electronic certificate codes of FIG. 1 according to an embodiment of the present invention.

FIGS. 1-3 illustrate exemplary embodiments of a network connected secure system 100. Generally, in some embodiments, the network connected secure system 100 of the invention includes a plurality of network connected computing systems 140, 150, 160 and a plurality of user devices 120, 130, all connected via a communication network 110. The computing systems 140, 150, 160 may be distributed on one or more physical servers, each having processor(s), memory, data storage, operating system, input/output interfaces, and network interface(s) all known in the art. The user device 120, 130 may include, for example, desktop computer, laptop, or any mobile or wearable device having a communication interface known in the art. The secure system 100 may include software resided in the computing systems 140, 150, 160, and in the user devices 120, 130. The software resided in the mobile user devices 120 may be in the form of mobile software applications, or mobile apps. The network 110 may be a private network, or a public network, such as the Internet and/or a cellular-based wireless network. The computing system 140 may be a cloud based server system.

In some embodiments, a computing system 140, 150, 160 may generate electronic certificates. The electronic certificates may be stored in one or more databases of the computing system 140, 150, 160. In some embodiments, each electronic certificate may include information that entitles a user associated with that certificate to certain rights, benefits, or the like. Each electronic certificate may also include, among other data, an electronic certificate code and an electronic certificate expiration date and time. The electronic certificate code may include an alpha-numeric code linked to one or more other data. In some embodiments, data linked to the certificate code may include data of an account stored in a database. The electronic certificate expiration date and time may include the date and time that a particular certificate code will expire.

In some embodiments, a computing system 140, 150, 160 may validate electronic certificates. This validation, described in more detail herein, can be one of several layers of security provided by the secure system 100, for example, making it difficult to share unauthorized copies of the electronic certificates. The validation may be performed in real-time, or at a pre-determined time, or both.

Other security layers provided by the computing system 140, 150, 160 may include, for example, caching, expiration rules, and a real-time expiration countdown user interface. In some embodiments, a two-factor authentication process may also be provided.

In some exemplary operations of the embodiments of the secure system 100, an account may be created and stored in a database, for example, database 142 as illustrated in FIG. 2. Data stored in the account may include, among other data, information relating to a user associated with the account, and one or more electronic certificates associated with the user and the user account. Mobile software applications (or mobile apps) as part of, or associated with, the system 100 may be downloaded to the user devices 120, 130 of the user. As part of the download, the user will receive an activation code from the secure system 100. The activation code may be delivered via email, text messages, or any other suitable form of communication. The user will be required to enter the activation code into the mobile app to validate the mobile app for use. In some embodiments, the user may be able to download the mobile app from the secure system 100, for example, from the database 144, or another database, via the electronic certificate engine 144. The user may also be able to download the mobile app from the like of Google Play, iTunes App Store, and so on.

It should be appreciated that the exemplary illustration of the computing system 140 may also be applicable to the computing systems 150 and 160, with equivalent components. In some embodiments, the computing systems 150 and 160 may include specific applications that use or operate on the electronic certificates and/or the electronic certificate codes.

The mobile apps communicate with computing system 140, 150, 160 to access and/or download information in or associated with the user account. In some embodiments, when the mobile app in the user device 120 is activated, the electronic certificates associated with the user and the user account may also be activated. In some embodiments, if the user loses his or her mobile device, the user can re-download the mobile app and use the same activation code as previously, to a new device. All past usage data will be uploaded/downloaded to the new device.

Once the user has satisfied the security layer of activating the mobile app resided on his or her device (in the exemplary embodiment of a mobile device), and activating the electronic certificates associated with his or her account, the user may be allowed to access and use these electronic certificates. In some embodiments, the electronic certificate engine 144 and/or the mobile app provide the electronic certificates and the associated electronic certificate codes for display. When the user accesses an electronic certificate, for example, by viewing and selecting an electronic certificate at a graphical user interface (GUI) provided by the mobile app and/or the system 100, the user may also access an electronic certificate code associated with that electronic certificate. The electronic certificate code must then be presented to an application, if the electronic certificate is to be used in that application.

The electronic certificate code may include an alpha-numeric code. The electronic certificate code may also include an expiration date and time when the electronic certificate code will expire. Electronic certificate codes may have either, or both, a finite date and time of expiration or an expiration period based on when they are initially displayed in an application.

It should be appreciated that, as illustrated in FIG. 3, the electronic certificate and/or the associated electronic certificate code are thus secured by multiple layers, or levels, of security. The first security layer includes the secure activation of a downloaded application, such as a mobile app, and the electronic certificate. The second security layer includes the secure access and retrieval of the electronic certificate and the associated electronic certificate code at time of use. The third security layer includes the expiration of the electronic certificate code, rendering the associated electronic certificate unusable. Another security layer may include the verification of the electronic certificate code.

Referring to FIGS. 4-8, an exemplary embodiment of the system 100 as implemented in a hotel loyalty program system 400 is illustrated. Generally, a hotel loyalty program system 400 may include, for example, secure electronic certificate computing system 440, hotel Property Management System (PMS) 450, hotel Point of Sale System (POS) 460, user devices 120, 130, electronic certificates, and mobile-optimized software 122 containing electronic certificates. As described herein, the computing systems 440, 450, 460 may be distributed on one or more physical servers, each having processor(s), memory, data storage, operating system, input/output interfaces, and network interface(s) all known in the art. In some embodiments, the computing system 440 may be operated by a third-party associated with one or more hotels. In some embodiments, the computing system 440 may be operated by the hotels. The computing system 440 may be a cloud based server system.

Figure 4A:
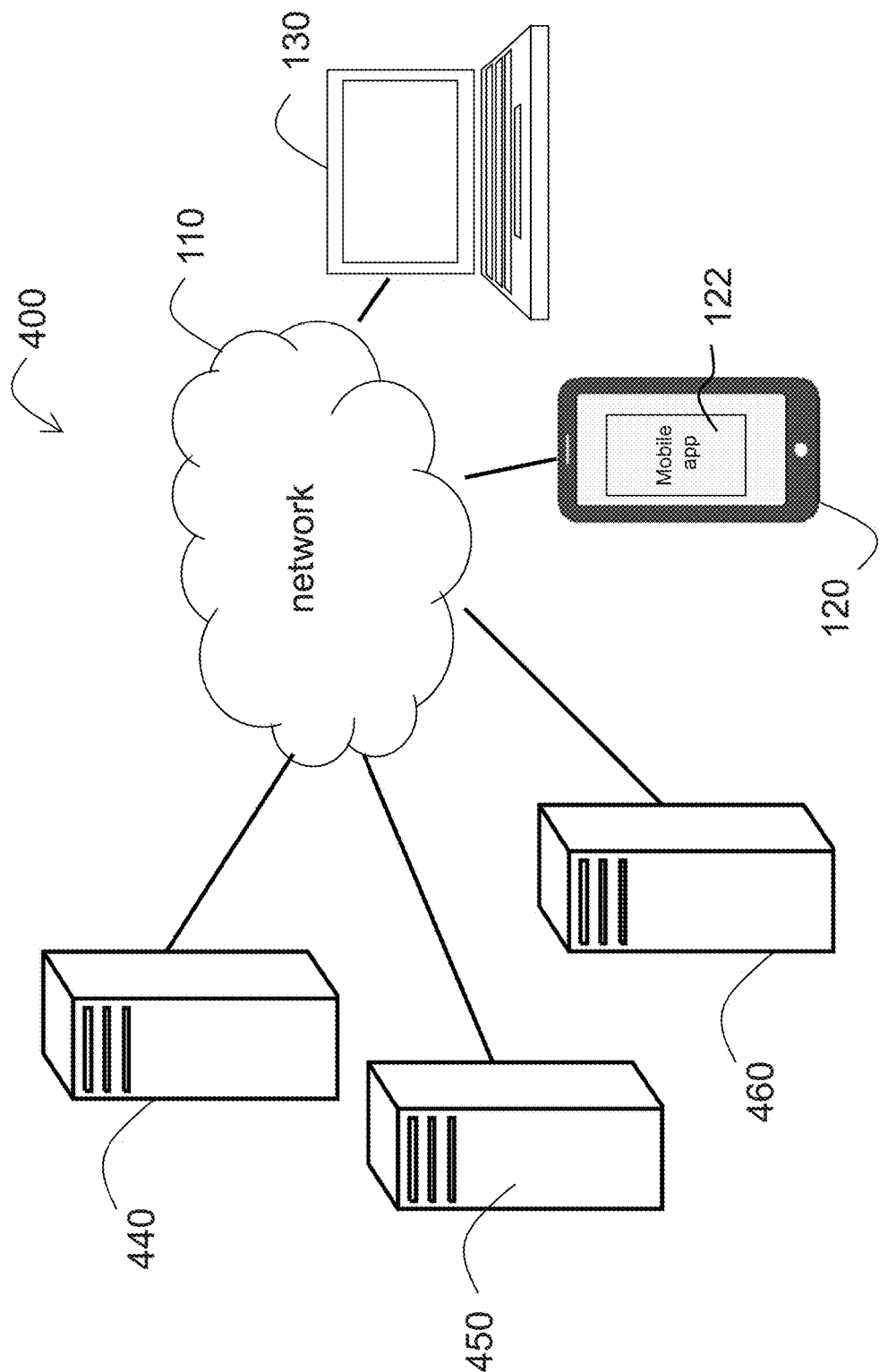
FIG. 4A illustrates a hotel loyalty program system according to an embodiment of the present invention.
Figure 4B:
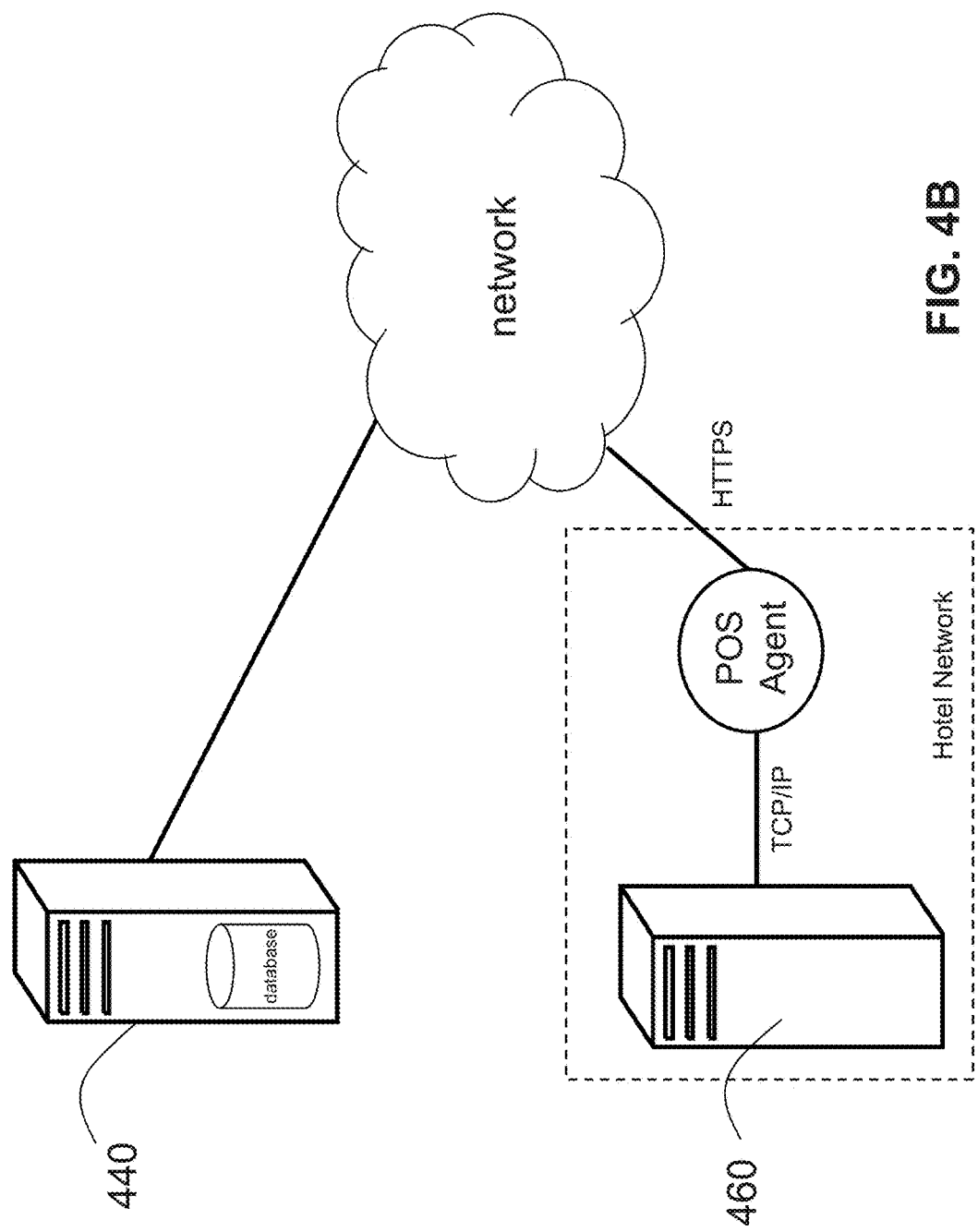
FIG. 4B illustrates a hotel loyalty program system including a hotel network having a POS system and POS agent according to an embodiment of the present invention.

FIG. 4B illustrates an exemplary embodiment of the hotel loyalty program system 400, showing the hotel POS 460 including a 2-way connection, for example, a TCP/IP connection, with a POS agent, which may be a communication interface software and/or hardware between the POS 460 and the computing system 440 and database. The communication between the POS agent and the computing system 440 may be a 2-way HTTPS connection, or other suitable communication technology known in the art.

In some embodiments, the mobile-optimized software is a mobile application (or mobile app) 122 which hosts one or more electronic certificates, which may be redeemed for goods or services at hotels participating in a loyalty marketing program. As described herein, the mobile application 122 may be downloaded from the computing system 440, or from the like of Google Play, iTunes App Store, and so on, to the user device 120.

Figure 5:
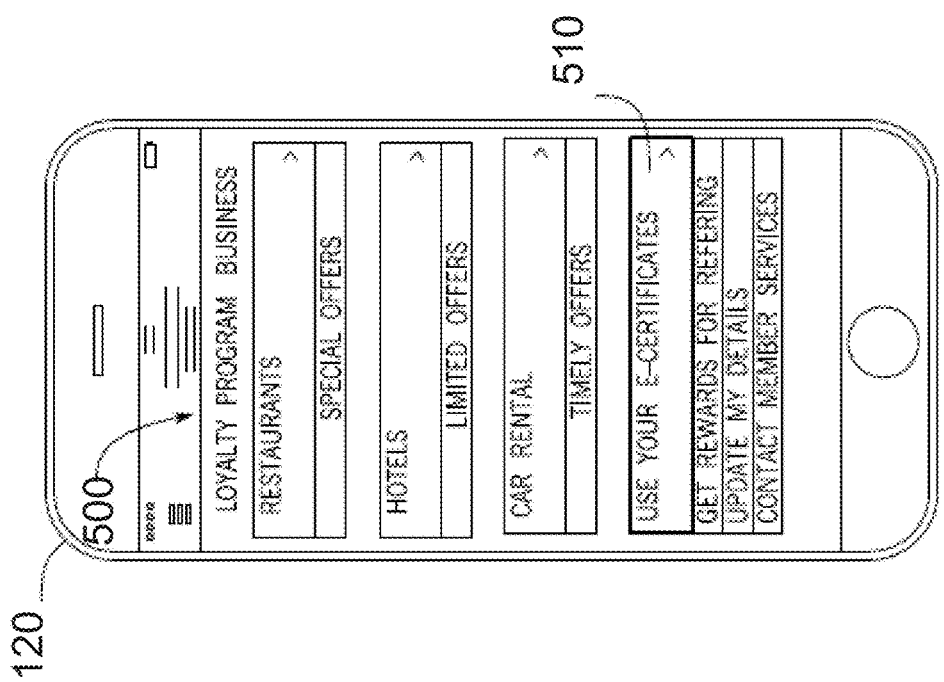
FIG. 5 illustrates a graphical user interface of a mobile software application of a loyalty program according to an embodiment of the present invention.

Referring to FIG. 5, the mobile application 122 may provide a GUI 500 which displays offers from loyalty programs, including from hotels, restaurants, and so on. The GUI 500 may also include a selectable option 510 for using electronic certificates available in a user's account.

Figure 6:
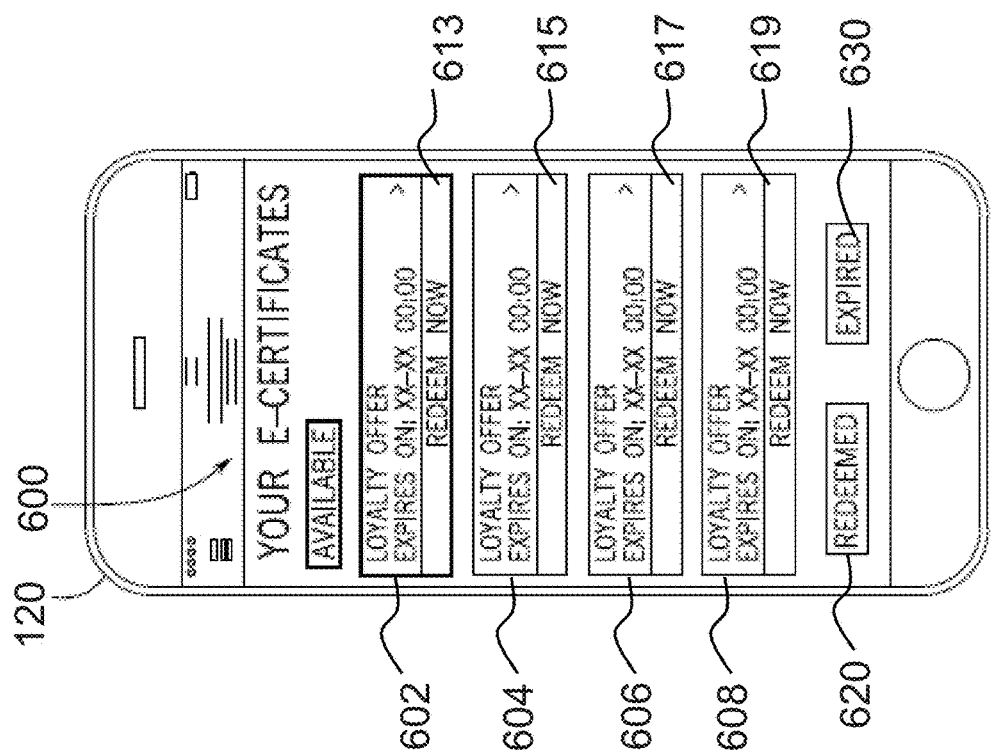
FIG. 6 illustrates a graphical user interface of a mobile software application of a loyalty program showing available electronic certificates according to an embodiment of the present invention.

Referring to FIG. 6, when a user selects the option 510 as illustrated in FIG. 5, the mobile application 122 retrieves, for example, from the computing system 440, a list of the electronic certificates available in a user's account, and provides a GUI 600 which displays them, for example, electronic certificates 602-608. In some embodiments, the list may also include the expiration date of each available electronic certificate. To view each electronic certificate, the user may select a "redeem" option for the electronic certificate, for example, the "Redeem Now" options 613-619. The GUI 600 may also include a selectable option 620 for displaying all electronic certificates that have been previously redeemed. The GUI 600 may also include a selectable option 630 for displaying all electronic certificates that have expired.

Figure 7:
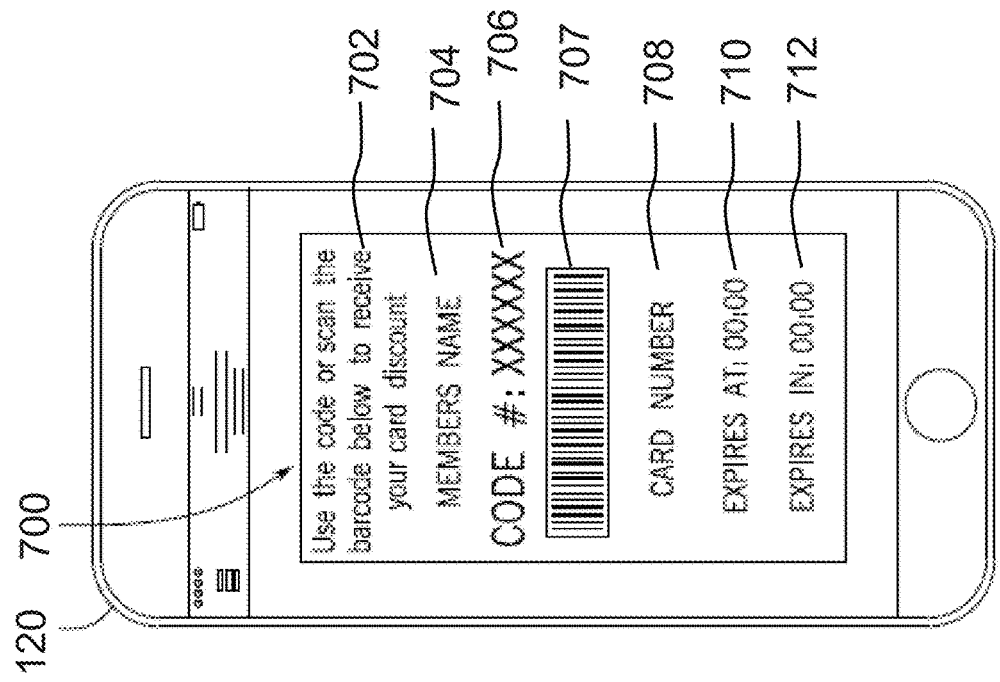
FIG. 7 illustrates a graphical user interface of a mobile software application of a loyalty program showing an electronic certificate code according to an embodiment of the present invention.

Referring to FIG. 7, when a user selects a "redeem" option, for example, options 613-619 as illustrated in FIG. 6, the mobile application 122 provides a GUI 700 which displays the selected electronic certificate. An electronic certificate 700 may include, for example, a description 702 of the specific redeemable benefit, the name 704 of the user (e.g., owner of the electronic certificate), an electronic certificate code 706, a scan-able bar code 707, a user's card number 708, a date and/or time 710 that the electronic certificate code expires, and a visual representation of the countdown 712 to the expiration date and time. In some embodiments, the bar code 707 may include a link, for example, a Uniform Resource Locator (URL), to the computing system 440 from which information about the electronic certificate and other related information may be retrieved. In some embodiments, the bar code 707 may include the information. The electronic certificate code 706 may include an alpha-numeric code linked to the user's account and a particular redeemable benefit. The expiration date and time is the date and time when the particular electronic certificate code will expire. Each electronic certificate code has a finite period of validity and an expiration date and time. Electronic certificate codes may have either, or both, a finite date and time of expiration or an expiration period based on when they are initially displayed by the user in the application. The countdown 712 may be a graphical representation of the countdown to expiration of a particular electronic certificate code. The countdown 712 may display the number of days, hours, and seconds remaining before expiration. The countdown may begin when the user selects to display a particular electronic certificate and the associated electronic certificate code. Each electronic certificate code includes duration of validity, which begins when the electronic certificate is selected for display, for example, by the user. When the electronic certificate code has expired, the countdown 712 may display, for example, "Code Expired," or similar verbiage. In some embodiments, when the electronic certificate code has expired, the scan-able barcode 707 may be removed from the GUI 700.

It should be appreciated that the mobile app 122 retrieves the information of the user's account for display from one or more databases stored in the user device 120, or at the computing system 440, or both.

As indicated above, the hotel loyalty program system 400 integrates a secure electronic certificate computing system 440, a hotel Property Management System (PMS) 450, and a hotel Point of Sale System (POS) 460. In some embodiments, a multiple-step security process must take place in order to validate an electronic certificate in a hotel loyalty program. As described herein, a user, for example, a member of a hotel loyalty program system 400 (which may include a paid-membership program), will download a mobile app 122 (in the embodiment of mobile user device 120), which is associated with the loyalty program system 400. The user will receive an activation code and enter the activation code in a GUI (not shown) provided by the mobile app 122. The system 400 will then validate the mobile app for use, and activate any electronic certificate available to the user. In some embodiments, activation codes may be included in a welcome email or text message, or a suitable communication format, sent to the user.

When the user retrieves an electronic certificate and the associated electronic certificate code, as illustrated in FIGS. 5-7, the electronic certificate code will be inputted, for example, by a hotel employee scanning a bar code or entering an electronic certificate code, into a graphical user interface of a PMS agent, which is a software utility installed on the computer or network of the hotel's PMS system. The PMS agent communicates with the secure electronic certificate computing system 440, for example, through HTTPS protocol, to validate the received electronic certificate code.

After the electronic certificate code has been validated, the electronic certificate code may be entered, for example, by a hotel employee, into the PMS, for example, via a guest reservation GUI or a bar code scanner or reader. Based on the redeemable benefit associated with the electronic certificate code, a hotel rate code may be selected, either by a hotel employee or by the PMS, for the PMS processing of, for example, the applicable room booking discount. If the electronic certificate code is not validated successfully, the redeemable benefit is not applied, for example, in the PMS agent.

In some embodiments, transactions generated from the use of the electronic certificates may be uploaded to a data repository stored in the hotel's PMS 450, for example, via a Data Transfer Utility (DTU) agent, after the hotel's daily night audit. The DTU agent may be a software utility installed on the computer or network of the hotel's network.

In some embodiments, in terms of the POS integration, a two-way integration between system 440 and system 460 (POS) may be provided via a POS agent installed on the hotel's POS network. The input of an electronic certificate code may also occur. The electronic certificate code may be entered, for example, by a hotel employee, in a graphical user interface (not shown) of the POS system. The POS agent communicates, for example, through HTTPS protocol to validate the entered electronic certificate code. After successful validation, by the secure electronic certificate computing system 440, of the electronic certificate code, the POS Script installed in the hotel's POS system calculates, for example, the applicable food and beverage dining discount, based on the redeemable benefit associated with the electronic certificate code. If the electronic certificate code is not validated successfully, the redeemable benefit is not applied, for example, in the hotel's POS system.

In some embodiments, when the user visits a participating restaurant, hotel or outlet and selects to redeem an electronic certificate, for example, selecting a "Redeem Now" option 613-619 as described herein, the electronic certificate may be considered at this point as redeemed. The computing system 440 may also obtain and store the location of the user device, for example, by communicating with the mobile application 122 to obtain the geolocation, (e.g., latitude and longitude) of the user device. The computing system 440 may correlate the location of the user device against one or more database of restaurants, hotels, or outlets to identify the restaurant, hotel or outlet for the redemption.

In some embodiments, the hotel loyalty program system 400 includes server-based electronic certificate validation. In these embodiments, the POS agent resides in the POS system 460, and the PMS agent resides in the PMS system 450.

In some embodiments, the hotel loyalty program system 400 includes server-based electronic certificate distribution. In these embodiments, the electronic certificates and the associated electronic certificate codes may be cached on a user's mobile device 120 for off-line use (for example, when a network connection is not available). In the case that cached electronic certificate codes are used while the user's device 120 is offline, the hotel loyalty program system 400 may reconcile which electronic certificate codes are expired and issue new, non-expired electronic certificate codes which can be utilized by the user at a future date and time.

In some embodiments, the hotel loyalty program system 400 includes web-based electronic certificate validation. In these embodiments, the hotel loyalty program system 400 provides a website to receive the electronic certificate codes for validation. The electronic certificate codes may be entered, for example, by a hotel staff. Other forms of inputting are also contemplated.

Referring to FIG. 8, in some exemplary operations, the hotel loyalty program system 400 operates as illustrated in the process 800. A user may first become a member of the hotel loyalty program, for example, by purchasing a membership (Step 802). Other ways of obtaining membership are also contemplated, for example, the system 400 may provide the user with a membership in consideration of other past services or purchases. The system 400 then creates or updates a user account. After membership fee payment (if required), the user (may hereinafter be referred to as "the member") is then able to download a mobile app 122 (Step 802, in embodiments of using a mobile device 120), which is associated with the membership loyalty program. The member may choose where to download their mobile app, from either the system 400, Google Play or iTunes App Store. The member will receive an activation code, and enter it into a form provided by the mobile app 122. As a result, the mobile app 122 will be valid for use and the electronic certificates in the user's account will be activated. In some embodiments, the activation code may be included in a welcome email or text message, or the like. As described herein, in some embodiments, if the member loses his or her phone, that member can re-download the mobile app and use the same activation code. All past usage data will be uploaded/downloaded to the new device, so the member will not lose any e-voucher privileges.

When the member logs into the system 400, the system 400 may provide for display to the member his or her virtual membership card, available electronic certificates and the associated electronic certificate codes (Step 806), as illustrated in FIGS. 6 and 7. The member may redeem the goods or use the services indicated in the electronic certificates, for example, staying at a hotel or dining at a restaurant associated with the loyalty program (Step 808). In some embodiments, the member may use an electronic certificate multiple times. A "Card Discount" is an example of a redeemable benefit which can be used multiple, and unlimited number of times. In other embodiments, an electronic certificate may be used only a limited number of times.

The member may use the GUIs, for example, as illustrated in FIGS. 5 to 7, to access and use the electronic certificates. For example, the member may receive an electronic certificate code (e.g., a five-digit or six-digit code), and present the code to a server in the restaurant for the associated discount to be applied (Step 810). As described herein, the member may redeem the certificate benefits by tapping a "Use your e-certificates" option 510 on the home screen 500, selecting a certificate to use from the listed certificates, and then tapping on "Redeem Now" options 613-619, the mobile app 122 will then display an electronic certificate code GUI 700.

At Steps 820, The system 400 verifies the member card and the electronic certificate. The PMS and POS systems may be utilized for the verification. The verification may be performed via a two-way communication against a production database, for example, database 142. The discount is applied if the electronic certificate code is successfully validated. The discount is not applied if the electronic certificate code is not successfully validated.

At Step 822, the system 400 saves all updated data to one or more databases.

The system 400 eliminates outdated paper-based voucher booklets as the members can view and print digital vouchers directly from the mobile app software. This streamlines hotel operations and provides detailed tracking with two-way hotel's POS/PMS integration, while improving analytics, intelligence and security. In some embodiments, links to leading CRM, E-Commerce, and IT systems of the system 400 provide real-time reporting and secure validation of each electronic certificate. The system 400 provides several multiple security layers including limited-duration codes for each electronic certificate, making it difficult to share unauthorized copies of electronic certificates.

In some embodiments, several programmatic logic gates reconfigure a processor of a computing device of the secure system 100, 400 when the mobile software application 122 is running, thereby ensuring that a user of the mobile device 120 can work with the process and the system 100, 400. The logic gates perform the functions and features as described herein.

In some embodiments, the process and system described herein may be adapted for use in non-hotel discount-based and/or redeemable benefit loyalty programs, where systems similar to hotel PMS or POS are used. One noteworthy example is in non-hotel restaurants.

The enablements described in detail above are considered novel over the prior art of record and are considered critical to the operation of at least one aspect of the apparatus and its method of use and to the achievement of the above described objectives. The words used in this specification to describe the instant embodiments are to be understood not only in the sense of their commonly defined meanings, but to include by special definition in this specification: structure, material or acts beyond the scope of the commonly defined meanings. Thus if an element can be understood in the context of this specification as including more than one meaning, then its use must be understood as being generic to all possible meanings supported by the specification and by the word or words describing the element.

The definitions of the words or drawing elements described herein are meant to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements described and its various embodiments or that a single element may be substituted for two or more elements in a claim.

Changes from the described subject matter as viewed by a person with ordinary skill in the art, now known or later devised, are expressly contemplated as being equivalents within the scope intended and its various embodiments. Therefore, obvious substitutions now or later known to one with ordinary skill in the art are defined to be within the scope of the defined elements. This disclosure is thus meant to be understood to include what is specifically illustrated and described above, what is conceptually equivalent, what can be obviously substituted, and also what incorporates the essential ideas.

The scope of this description is to be interpreted only in conjunction with the appended claims, if any, and it is made clear, here, that each named inventor believes that the claimed subject matter is what is intended to be patented.

What is claimed is:

1. A network connected secure system for validating electronic certificate codes, comprising:
    a network connected secure computing system communicatively coupled to a network for access by a plurality of users at a plurality of user devices;
    a database coupled to the network connected secure computing system to store information including at least a user account, one or more electronic certificates associated with the user account, and one or more electronic certificate codes associated with the one or more electronic certificates;
    a mobile software application downloadable from the network connected secure computing system to a user device of the plurality of user devices; and
    the network connected secure computing system is configured to:
    provide an activation code associated with the user account to a user of the user device,
    validate the downloaded mobile software application for use in response to receiving the activation code from the user device,
    activate the one or more electronic certificates in response to validating the downloaded mobile software application,
    provide the one or more electronic certificates associated with the user account for display at the user device, and
    provide the one or more electronic certificate codes for display at the user device, and wherein the mobile software application comprises one or more graphical user interfaces configured to:
    display the one or more electronic certificates, and
    display a graphical representation of a countdown to expiration of an electronic certificate code associated with an electronic certificate in response to receiving a user's selection of the electronic certificate from the one or more displayed electronic certificates.

2. The network connected secure system of claim 1, wherein each of the one or more electronic certificate codes includes an alpha-numeric code.

3. The network connected secure system of claim 2, wherein the alpha-numeric code links to information stored in the associated user account.

4. The network connected secure system of claim 1, wherein each of the one or more electronic certificates includes an expiration date and time.

5. The network connected secure system of claim 1, wherein the one or more graphical user interfaces display the one or more electronic certificate codes.

6. The network connected secure system of claim 1, wherein the graphical representation of a countdown includes the number of days, hours, and seconds remaining before the expiration of the electronic certificate code.

7. The network connected secure system of claim 1, wherein the graphical representation of a countdown begins when the electronic certificate code is displayed.

8. The network connected secure system of claim 1, wherein the one or more graphical user interfaces display a scannable barcode associated with an electronic certificate code in response to receiving a user's selection of an electronic certificate from the one or more displayed electronic certificates, wherein the electronic certificate is stored in association with the user account and the electronic certificate code.

9. The network connected secure system of claim 1, wherein the electronic certificates entitle users of the associated user accounts to certain rights or benefits.

10. A computer-readable non-transitory storage medium configured with data and with instructions that when executed by at least one processor causes the at least one processor to perform a process for validating electronic certificate codes, the process comprising:
    creating a user account associated with a user of a user device;
    generating one or more electronic certificates associated with the user account;
    generating one or more electronic certificate codes associated with the one or more electronic certificates;

storing the user account, the one or more electronic certificates, and the one or more electronic certificate codes in one or more databases;

downloading a mobile software application to the user device, wherein the mobile software application comprises one or more graphical user interfaces;

providing an activation code associated with the user account to the user;

validating the downloaded mobile software application for use in response to receiving the activation code from the user device;

activating the one or more electronic certificates in response to validating the downloaded mobile software application; and providing the one or more electronic certificates for display at the user device, wherein the one or more graphical user interfaces are configured to display the one or more electronic certificates and to display a graphical representation of a countdown to expiration of an electronic certificate code associated with an electronic certificate in response to receiving a user's selection of the electronic certificate from the one or more displayed electronic certificates.

11. The computer-readable non-transitory storage medium of claim 10, wherein each of the one or more electronic certificate codes includes an alpha-numeric code.

12. The computer-readable non-transitory storage medium of claim 10, wherein each of the one or more electronic certificates includes an expiration date and time.

13. The computer-readable non-transitory storage medium of claim 10, wherein the one or more graphical user interfaces display the one or more electronic certificate codes.

14. The computer-readable non-transitory storage medium of claim 10, wherein the graphical representation of a countdown begins when the electronic certificate is displayed.

15. The network connected secure system of claim 1, wherein the activation code is provided to the user via an email or a text message.

* * * * *